(12) United States Patent
Mäkimattila

(10) Patent No.: US 9,682,845 B2
(45) Date of Patent: Jun. 20, 2017

(54) ROPE LOAD DETECTING DEVICE FOR DETECTING THE TOTAL ROPE LOAD IN MULTIPLE ELEVATOR ROPES

(71) Applicant: KONE Corporation, Helsinki (FI)

(72) Inventor: Simo Mäkimattila, Shanghai (CN)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 15/055,189

(22) Filed: Feb. 26, 2016

(65) Prior Publication Data

US 2016/0251200 A1    Sep. 1, 2016

(30) Foreign Application Priority Data

Feb. 28, 2015 (CN) .......................... 2015 1 0090596

(51) Int. Cl.

| | |
|---|---|
| *G01L 1/26* | (2006.01) |
| *B66B 7/12* | (2006.01) |
| *B66B 1/34* | (2006.01) |
| *B66B 5/14* | (2006.01) |
| *G01L 5/10* | (2006.01) |
| *B66B 5/00* | (2006.01) |

(52) U.S. Cl.
CPC .......... *B66B 7/1215* (2013.01); *B66B 1/3484* (2013.01); *B66B 5/0018* (2013.01); *B66B 5/145* (2013.01); *G01L 5/10* (2013.01); *G01L 5/102* (2013.01); *G01L 5/105* (2013.01)

(58) Field of Classification Search
CPC ... B66B 7/1215; B66B 1/3484; B66B 5/0018; B66B 5/145; G01L 5/10; G01L 5/102; G01L 5/105

USPC ............................ 73/826, 828, 832, 862.381
See application file for complete search history.

(56) References Cited

U.S. PATENT DOCUMENTS

| | | | | |
|---|---|---|---|---|
| 3,174,334 | A * | 3/1965 | McKernan ................ | G01L 5/06 346/141 |
| 3,372,582 | A * | 3/1968 | Weiss ........................ | G01L 5/06 73/862.451 |
| 4,492,363 | A * | 1/1985 | Niskin ..................... | B66D 1/36 254/275 |
| 5,031,847 | A * | 7/1991 | Tanaka ................... | B65H 59/36 226/11 |
| 5,731,528 | A * | 3/1998 | Yamazaki ............ | B66B 5/0087 73/828 |

(Continued)

*Primary Examiner* — Max Noori
(74) *Attorney, Agent, or Firm* — Birch, Stewart, Kolasch & Birch, LLP

(57) ABSTRACT

A rope load detecting device for detecting total rope load in multiple elevator ropes, includes a frame held on the multiple elevator ropes, and a force sensing element. The frame includes a tension beam, a first and second connecting bars, a movable member and a supporting beam, one end of the first and second connecting bars is fixed to the tension beam, the other end is fixed to the supporting beam, one end of the movable member is connected to the tension beam, the other end freely passes the supporting beam. The frame is configured to enable the part of each elevator rope passing through the first and second connecting bars and the movable member of the frame to be bent so that enable the force caused by each loaded elevator rope to act on the force sensing element by means of the movable member of the frame, whereby the total rope load in multiple elevator ropes can be detected by a single force sensing element.

20 Claims, 3 Drawing Sheets

(56) References Cited

U.S. PATENT DOCUMENTS

| | | | | |
|---|---|---|---|---|
| 6,123,176 A | * | 9/2000 | O'Donnell | B66B 7/10 187/393 |
| 2009/0314584 A1 | * | 12/2009 | Smith | B66B 1/3484 187/247 |
| 2014/0182975 A1 | * | 7/2014 | Ikonen | B66B 5/0031 187/251 |
| 2014/0290388 A1 | * | 10/2014 | Gonzalez Gallegos | G01L 5/107 73/862.391 |
| 2014/0306829 A1 | * | 10/2014 | Pereira | B66B 5/12 340/668 |
| 2015/0122588 A1 | * | 5/2015 | Kalliomaki | B66B 7/068 187/264 |
| 2015/0166305 A1 | * | 6/2015 | Kalliomaki | B66B 7/064 187/254 |

\* cited by examiner

ROPE LOAD DETECTING DEVICE FOR DETECTING THE TOTAL ROPE LOAD IN MULTIPLE ELEVATOR ROPES

FIELD OF THE INVENTION

The object of the invention relates to a rope load detecting device, more specifically, to a rope load detecting device for detecting the total rope load in multiple elevator ropes using a single force sensing element.

DESCRIPTION OF BACKGROUND ART

In the known solution for detecting the total rope load in multiple elevator ropes, each of the elevator ropes has an individual rope load detecting device, therefore it is needed to provide a plurality of rope load detecting device when the total rope load in multiple elevator ropes is needed to be detected, then the rope load detected by each rope load detecting device is summed up.

As the wiring and detecting are needed for each of the rope load detecting devices, it is arduous and inconvenient for the wiring and detecting of the present rope load detecting device.

Additionally, it is inconvenient for the mounting of the each rope load detecting device as each of them is needed to be attached to the elevator ropes, and with the increase of the elevator ropes, more rope load detecting device is needed, thus the cost will be increased correspondingly.

Therefore, there is a need for a rope load detecting device for detecting the total rope load in multiple elevator with a convenient mounting, reliable working and low cost.

BRIEF DESCRIPTION OF THE INVENTION

The invention is made based on the issues above-mentioned, the object of the invention is to provide a rope load detecting device with a convenient mounting, reliable working and low cost. In the invention, the total rope load in multiple elevator ropes is detected by a rope load detecting device including a frame and a single fore sensing element, thus a convenient operating and reliable working is achieved through such a device.

The object of the invention is realized by providing a rope load detecting device for detecting the total rope load in multiple elevator ropes using a single force sensing element, the rope load detecting device comprises a frame held on the multiple elevator ropes; a force sensing element provided in the frame, wherein the frame is configured to enable the part of each elevator rope passing through the frame to be bent so that enable the force caused by each loaded elevator rope to act on the force sensing element, whereby the total rope load in multiple elevator ropes can be detected by the force sensing element.

In the preferable embodiments of the invention, the force sensing element is a single force sensing element.

In the preferable embodiments of the invention, the frame includes a tension beam, the force sensing element being provided in the tension beam; a first connecting bar, a first end of the first connecting bar being fixed to a top end of the tension beam; a second connecting bar, a first end of the second connecting bar being fixed to a bottom end of the tension beam; a movable member, a first end of the movable member being connected to the tension beam and cooperated with the first and second connecting bars to enable each elevator rope to be bent at a predetermined angle, wherein the first and second connecting bars and the movable member cooperate with each other to enable the force caused by each loaded rope in multiple elevator ropes to act on the force sensing element by means of the movable member.

In the preferable embodiments of the invention, the tension beam is arranged to have a same orientation with the loaded elevator ropes, the movable member is provided perpendicularly to the tension beam.

In the preferable embodiments of the invention, the first and second connecting bars are provided parallel to the movable member.

In the preferable embodiments of the invention, each of the first and second connecting bars and the movable member is formed with a plurality of contact portions spaced apart to each other sequentially along the their length direction away from the tension beam, each of the contact portions respectively contacts the respective one of the multiple elevator ropes arranged along a direction away from the tension beam, whereby each elevator rope contacts with the first and second connecting bars and the movable member at three respective contact portions, wherein each contact portion in the movable member offsets a distance toward a direction away from the tension beam with respect to each respective contact portion in the first and second connecting bars so that each elevator rope contacted with the contact portions in the first and second connecting bars and the movable member can be bent at predetermined angle.

In the preferable embodiments of the invention, the spacing between contact portions in each of the first and second connecting bars and the movable member is/are arranged to match to the spacing between the respective elevator ropes, and the frame is held on the multiple elevator ropes by means of contact portions in each of the first and second connecting bars and movable member in frictional contact with the respective elevator ropes.

In the preferable embodiments of the invention, the respective contact portions in the first and second connecting bars are arranged symmetrically or unsymmetrically with respect to the movable member.

In the preferable embodiments of the invention, each elevator rope in multiple elevator ropes is respectively in contact with the surfaces of respective contact portions of the first and second connecting bars toward to the tension beam, and each elevator rope in multiple elevator ropes is respectively in contact with the surfaces of respective contact portions of the movable member away from the tension beam.

In the preferable embodiments of the invention, the tension beam is provided with an elliptical or rectangular opening, the force sensing element is provided in the opening.

In the preferable embodiments of the invention, the material and stiffness of the tension beam is selected to produce strain as needed for the force sensing element.

In the preferable embodiments of the invention, the frame further includes a supporting beam, top end of the supporting beam is fixedly connected to second end of the first connecting bar and bottom end of the supporting beam is fixedly connected to second end of the second connecting bar, an aperture is provided between the top and bottom ends of the supporting beam for accommodating second end of the movable member, so that the movable member can freely move toward the tension beam so that exert a pressure on the force sensing element located in the tension beam.

In the preferable embodiments of the invention, the contact portions are in the form of guiding pins or guiding grooves.

In the preferable embodiments of the invention, in an elevator with a roping system 1:1, a single rope load detecting device is provided in the position near the end of the elevator ropes fixed on the car side.

In the preferable embodiments of the invention, the rope load difference detected by the rope load detecting device in the up and down movement direction of elevator car gives an indication of guiding friction of the elevator car.

In the preferable embodiments of the invention, in an elevator with a roping system 2:1, two rope load detecting devices are respectively provided in the position near the two fixed ends of the elevator ropes.

In the preferable embodiments of the invention, the total ropes load difference detected respectively by the two rope load detecting devices give an indication of the total friction caused by the guiding friction of the elevator car and counterweight friction and pulleys friction.

The rope load detecting device is used not only to total rope load in multiple elevator ropes but also to detect the several operating parameters such as friction in the elevator and so on by means of the detected total rope load and the position of placement of the rope load detecting device in different roping systems.

Additionally, compared to known solutions, only one force sensing element needs to be wired and detected, thus only one force sensing element needs to be calibrated. The rope load detecting device doesn't need to be attached to rope. Due to constant bending of rope and the friction, the rope load detecting device will stay on its place as long as ropes are used. Also, there is no limit of number of ropes. The rope load detecting device is insensitive to rope distances, and the individual rope distances may be different.

BRIEF DESCRIPTION OF THE DRAWINGS

The other objects, features and industrial and technical importance of the invention will be more apparent through the following detailed description of the specific embodiment of the invention and with reference to the attached figures, wherein.

DETAILED DESCRIPTION OF THE INVENTION

In the following, the preferred embodiment of the invention will be described in detail with reference to the attached figures.

Figure 1:
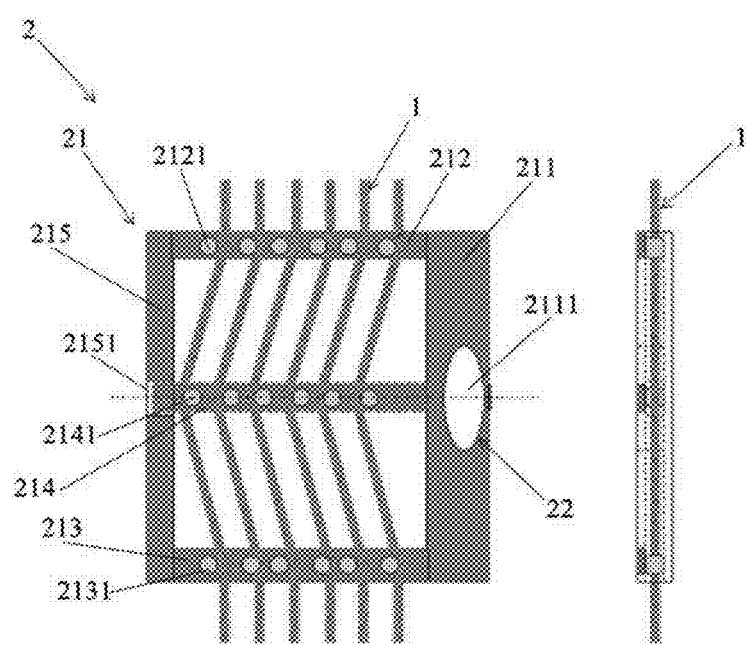
FIG. 1 shows a rope load detecting device for detecting the total rope load in multiple ropes according to the invention.
Figure 2:
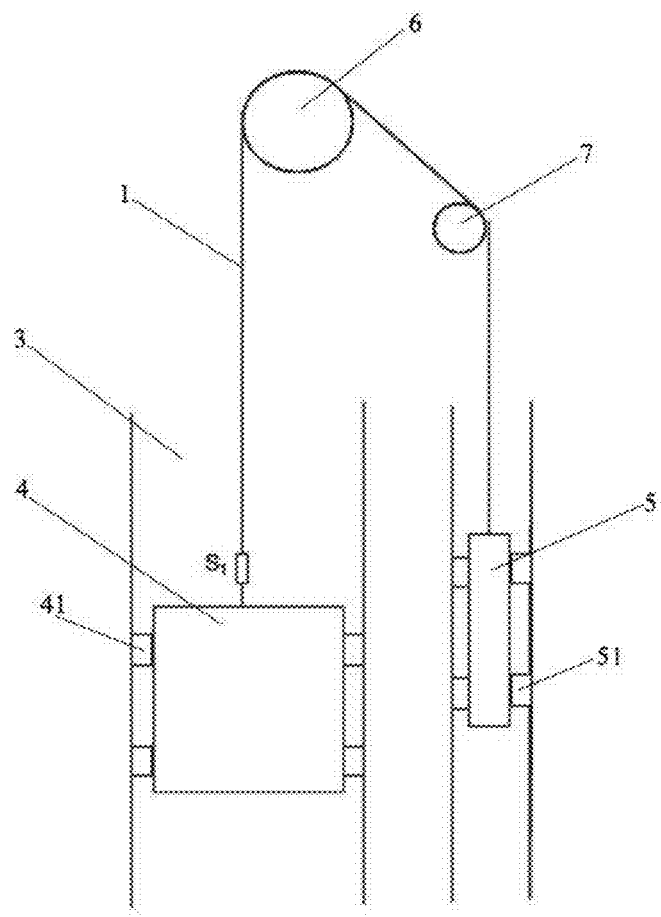
FIG. 2 shows the location of a single rope load detecting device according to the invention arranged on the elevator ropes in an elevator with roping system 1:1.
Figure 3:
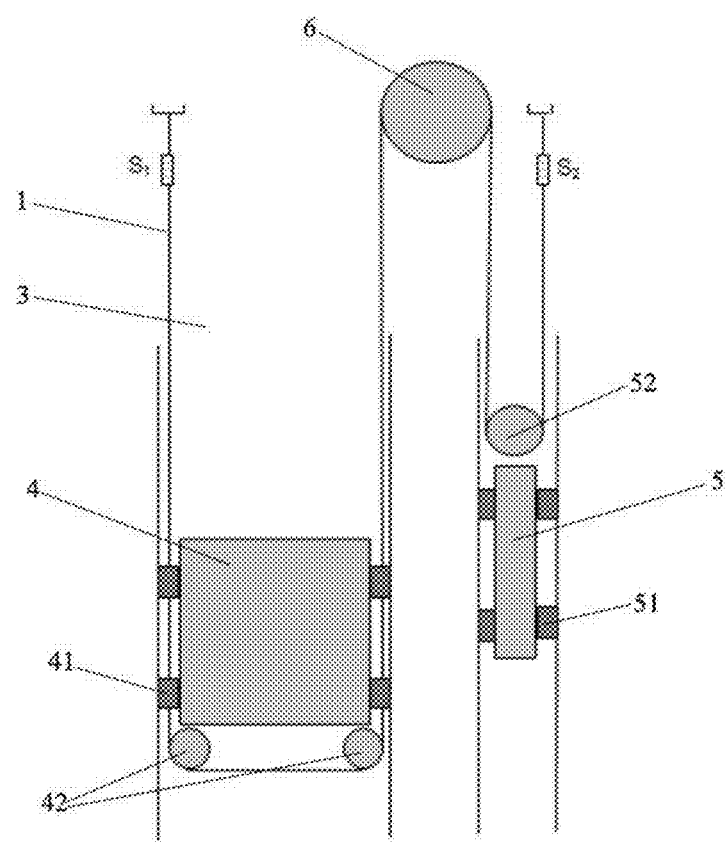
FIG. 3 shows the location of two rope load detecting devices according to the invention arranged on the elevator ropes in an elevator with roping system 2:1.

FIG. 1 is a view showing the specific structure of the rope load detecting device 2 according to the invention. FIGS. 2 and 3 are a view showing the position of the rope load detecting device 2 according to the invention arranged on the elevator ropes 1 in an elevator with a roping system 1:1, 2:1. In the following, the specific structure of the rope load detecting device 2 for detecting total rope load according to the invention will be introduced in detail in combination with the figures.

As shown in FIG. 1, the rope load detecting device 2 according to the invention includes a frame 21 and a force sensing element 22. The frame has a substantially rectangular shape, the frame is held on the multiple elevator ropes 1 by means of a frictional contact with the elevator ropes. The force sensing element is provided in the frame 21 for detecting the force exerted on the frame 21 by loaded elevator ropes 1, preferably, the force sensing element 22 is a single force sensing element, surely a plurality of force sensing elements can be provided as needed as long as the technical object of the invention can be achieved. Wherein, the frame 21 is configured to enable the part of each elevator rope 1 passing through the frame to be bent so that enable the force caused by each loaded elevator rope to act on the force sensing element 22, whereby the total rope load in multiple elevator ropes 1 can be detected by the force sensing element.

Specifically, as shown in FIG. 1, the frame substantially includes a tension beam 211, a first connecting bar 212, a second connecting bar 213, a movable member 214 and a supporting beam 215.

Preferably, the tension beam 211 is arranged to have a same orientation with the loaded elevator ropes 1 and is provided with an elliptical or rectangular opening 2111 for accommodating the force sensing element 22. The force sensing element may be a pressure sensor, stress strain gauge, optical or electrical contact sensor or indicator dial to indicate the bending strain of the tension beam and so on. The material and stiffness of the tension beam is selected to produce strain as needed for the force sensing element 22, if the a strain gauge is used, the elliptical or rectangular opening 2111 enables the stress exerted on the tension beam by loaded elevator ropes to concentrate so that the stress is transmitted to the force sensing element in the opening.

A first end of the first connecting bar 212 is fixed to a top end of the tension beam 211, a second end of the first connecting bar is fixed a top end of the supporting beam 215. A first end of the second connecting bar 213 is fixed to a bottom end of the tension beam 211, a second end of the second connecting bar 213 is fixed a bottom end of the supporting beam 215. Preferably, the movable member 214 is provided perpendicularly to the tension beam 211, a first end of the movable member is connected to the tension beam 211 via a point contact with the tension beam and is cooperated with the first and second connecting bars 212, 213 so that each elevator rope passing through them bends at a different point with respect to the orientation of the elevator ropes, as shown in FIG. 1, wherein the first and second connecting bars and the movable member cooperate with each other to enable the force caused by each loaded rope in multiple elevator ropes to act on the force sensing element by means of the movable member. The first and second connecting bars are preferably rod-shaped. An aperture 2151 is provided between the top and bottom ends of the supporting beam for accommodating second end of the movable member 214, so that the movable member can freely move toward the tension beam 211 so that exert a pressure on the force sensing element located in the tension beam. Preferably, the first and second connecting bars 212, 213 are provided parallel to the movable member 214.

Each of the first and second connecting bars 212, 213 and the movable member 214 is formed with a plurality of contact portions 2121, 2131, 2141 spaced apart to each other sequentially along the their length direction away from the tension beam, each of the contact portions respectively contacts the respective one of the multiple elevator ropes arranged along a direction away from the tension beam, whereby each elevator rope contacts with the first and second connecting bars and the movable member at three respective contact portions, as shown in FIG. 1. Wherein each contact portion 214 in the movable member offsets a distance toward a direction away from the tension beam with respect to each respective contact portion 2121, 2131 in the first and second connecting bars so that each elevator rope contacted with the contact portions in the first and second connecting bars and the movable member can be bent at predetermined angle. Preferably, the respective contact portions 2121, 2131 in the first and second connecting bars are arranged symmetrically with respect to the movable member, or unsymmetrically. Preferably, the contact portions are in the form of guiding pins, or guiding grooves as long as the technical object of the invention is achieved. Preferably, the spacing between contact portions in each of the first and second connecting bars and the movable member is/are arranged to match to the spacing between the respective elevator ropes, and preferably, the parts of the elevator ropes bent to pass through the frame are parallel to each other. The frame is held on the multiple elevator ropes by means of contact portions in each of the first and second connecting bars and movable member in frictional contact with the respective elevator ropes.

Further, each elevator rope 1 in multiple elevator ropes is respectively in contact with the surfaces of respective contact portions 2121, 2131 of the first and second connecting bars 212, 213 toward to the tension beam, and each elevator rope in multiple elevator ropes is respectively in contact with the surfaces of respective contact portions 2141 of the movable member 214 away from the tension beam. Thus, when the frame 21 is held on the multiple elevator ropes 1, the loaded elevator ropes exert a pull force on the top and bottom end of the tension beam 211 by means of the respective contact portion 2121, 2131 of the first and second connecting bars and exert a pressure on the part of the tension beam between the top and bottom end of the tension beam, preferably the tension beam centerpoint of gravity, by means of the respective contact portions 2141 of the movable member 214, so that the tension beams produces a bending strain, such a bending strain is concentrated on the opening in the tension beam and further is transmitted to the force sensing element 22. The force exerted on the force sensing element by the loaded elevator ropes by means of the movable member is equal to the sum of all the individual rope tension force, or is proportion to the sum of the sum of all the individual rope tension force, the individual rope tension force is measured from the force needed to bend the loaded rope to a predetermined angle. The force to keep the bending angle is measured in predetermined arbitrary angle in relation to the rope.

The specific structure of the rope load detecting device 2 according to the invention is introduced above. The rope load detecting device 2 according to the invention is used not only to total rope load in multiple elevator ropes but also to detect the several operating parameters such as friction in the elevator and so on by means of the detected total rope load and the position of placement of the rope load detecting device in different roping systems.

FIG. 2 shows a elevator with a roping system 1:1, the elevator includes elevator car 4, elevator shaft 3 in which the elevator moves up and down, car guiding rail 41 contacted with the elevator car 4 and provided in the elevator shaft, driving pulley 6 driving the elevator to move, guiding pulley 7, counterweight 5 and counterweight guiding rail 51. In the elevator with a roping system 1:1, single rope load detecting device is provided in the position S1 near the end of the elevator ropes fixed on the car side, as shown in FIG. 2. The rope load detecting device can detect the total rope load when the car is moving. When the car is moving, the real-time dynamic rope force can be detected. If motor output moment is known, the rope load difference detected in up and down movement direction of the elevator car by the rope load detecting device gives an indication of guiding friction force of the elevator car, that is to say, the guiding friction force of the elevator car can be calculated.

FIG. 3 shows a elevator with a roping system 2:1, the elevator includes elevator car 4, elevator shaft 3 in which the elevator moves up and down, car guiding rail 41 contacted with the elevator car 4 and provided in the elevator shaft, car pulley 42 under the elevator car, driving pulley 6 driving the elevator to move, counterweight 5, counterweight pulley 52 above the counterweight and counterweight guiding rail 51. In the elevator with a roping system 2:1, two rope load detecting devices are respectively provided in the position $S_1$, $S_2$ near the two fixed ends of the elevator ropes, as shown in FIG. 3. If motor output moment is known, the total rope load difference detected respectively by the two rope load detecting devices gives an indication of the total friction caused by the guiding friction of the elevator car and counterweight friction and pulleys friction.

Although the invention is described in detail above with reference to the preferred embodiment of the invention, the invention is not limited to the embodiments above-mentioned, it should be noted that, a various modification can be made by the skilled in the art and the elements thereof can be substituted by its equivalent without departing from the inventive scope defined in the claims. Furthermore, it is clear for a combination of technical features, elements and/or function among the various aspects of the invention, therefore, according to such a disclosure, the skilled in the art can conceive to combine the technical features, elements and/or function included in these embodiments to other aspect as needed, unless it is otherwise described for the above disclosure. Additionally, according to the teaching of the invention, a various modifications can be made to adapt to special case or materials without departing from the essential scope of the invention. Therefore, the invention is not limited to the individual embodiment illustrated by the attached figures, and the specific embodiments described in the description of the invention and used as the optimal embodiments to implement the concept of the invention at present, and the invention is intended to includes all the embodiments falling within the scope of above-described description and claims attached.

The invention claimed is:

1. A rope load detecting device for detecting total rope load in multiple elevator ropes, the rope load detecting device comprising:
    a frame held on the multiple elevator ropes, the frame having an opening; and
    a force sensing element provided in the opening of the frame,
    wherein the frame is configured to enable a part of each elevator rope passing through the frame to be bent in order to concentrate the force caused by each rope towards the opening of the frame and to the force sensing element, whereby the total rope load in multiple elevator ropes can be detected by the force sensing element.

2. The rope load detecting device according to claim 1, wherein the force sensing element is a single force sensing element.

3. The rope load detecting device according to claim 1, wherein the frame includes:

a tension beam, the force sensing element being provided in the tension beam;

a first connecting bar, a first end of the first connecting bar being fixed to a top end of the tension beam;

a second connecting bar, a first end of the second connecting bar being fixed to a bottom end of the tension beam; and a movable member, a first end of the movable member being connected to the tension beam and cooperated with the first and second connecting bars to enable each elevator rope to be bent at a predetermined angle, wherein the first and second connecting bars and the movable member cooperate with each other to enable the force caused by each rope to act on the force sensing element by means of the movable member.

4. The rope load detecting device according to claim 3, wherein the tension beam is arranged to have a same orientation as the elevator ropes, and the movable member is provided perpendicularly to the tension beam.

5. The rope load detecting device according to claim 4, wherein the first and second connecting bars are provided parallel to the movable member.

6. The rope load detecting device according to claim 4, wherein each of the first and second connecting bars and the movable member is formed with a plurality of contact portions spaced apart from each other sequentially along the their length direction away from the tension beam, each of the contact portions respectively contacts one of the multiple elevator ropes at a location spaced from the tension beam, whereby each elevator rope contacts the first and second connecting bars and the movable member at three respective contact portions, and wherein each contact portion in the movable member is located at a position offset from respective contacts portions in the first and second connecting bars in a direction away from the tension beam, so that each elevator rope contacting the contact portions in the first and second connecting bars and the movable member can be bent at a predetermined angle.

7. The rope load detecting device according to claim 6, wherein the spacing between contact portions in each of the first and second connecting bars and the movable member is/are arranged to match to the spacing between the respective elevator ropes, and wherein the frame is held on the multiple elevator ropes by frictional contact of contact portions in each of the first and second connecting bars and movable member with the respective elevator ropes.

8. The rope load detecting device according to claim 7, wherein the respective contact portions in the first and second connecting bars are arranged symmetrically or unsymmetrically with respect to the movable member.

9. The rope load detecting device according to claim 3, wherein each elevator rope is respectively in contact with the surfaces of respective contact portions of the first and second connecting bars toward to the tension beam, and each elevator rope is respectively in contact with the surfaces of respective contact portions of the movable member away from the tension beam.

10. The rope load detecting device according to claim 4, wherein the opening has an elliptical or rectangular shape and is provided in the tension beam.

11. The rope load detecting device according to claim 10, wherein the material and stiffness of the tension beam is selected to produce strain as needed for the force sensing element.

12. The rope load detecting device according to a claim 4, wherein the frame further includes a supporting beam, a top end of the supporting beam is fixedly connected to a second end of the first connecting bar and a bottom end of the supporting beam is fixedly connected to a second end of the second connecting bar, and an aperture is provided between the top and bottom ends of the supporting beam for accommodating second end of the movable member, so that the movable member can freely move toward the tension beam so that exert a pressure on the force sensing element located in the tension beam.

13. The rope load detecting device according to claim 7, wherein the contact portions are in the form of guiding pins or guiding grooves.

14. The rope load detecting device according to claim 1, wherein in an elevator with a roping system 1:1, a single rope load detecting device is provided in the position near the end of the elevator ropes fixed on the car side.

15. The rope load detecting device according to claim 14, wherein the rope load difference detected by the rope load detecting device in the up and down movement direction of elevator car gives an indication of guiding friction of the elevator car.

16. The rope load detecting device according to claim 1, wherein in an elevator with a roping system 2:1, two rope load detecting devices are respectively provided in the position near the two fixed ends of the elevator ropes.

17. The rope load detecting device according to claim 16, wherein the total ropes load difference detected respectively by the two rope load detecting devices give an indication of the total friction caused by the guiding friction of the elevator car and counterweight friction and pulleys friction.

18. The rope load detecting device according to claim 2, wherein the frame includes:

a tension beam, the force sensing element being provided in the tension beam;

a first connecting bar, a first end of the first connecting bar being fixed to a top end of the tension beam;

a second connecting bar, a first end of the second connecting bar being fixed to a bottom end of the tension beam; and a movable member, a first end of the movable member being connected to the tension beam and cooperated with the first and second connecting bars to enable each elevator rope to be bent at a predetermined angle, wherein the first and second connecting bars and the movable member cooperate with each other to enable the force caused by each rope to act on the force sensing element by means of the movable member.

19. The rope load detecting device according to claim 5, wherein each of the first and second connecting bars and the movable member is formed with a plurality of contact portions spaced apart from each other sequentially along the their length direction away from the tension beam, each of the contact portions respectively contacts one of the multiple elevator ropes at a location spaced from the tension beam, whereby each elevator rope contacts the first and second connecting bars and the movable member at three respective contact portions, and wherein each contact portion in the movable member is located a position offset from respective contact portions in the first and second connecting bars in a direction away from the tension beam, so that each elevator rope contacting the contact portions in the first and second connecting bars and the movable member can be bent at a predetermined angle.

20. The rope load detecting device according to claim 5, wherein the opening has an elliptical or rectangular shape and is provided in the tension beam.

\* \* \* \* \*